US008850576B2

(12) United States Patent
Guzner et al.

(10) Patent No.: US 8,850,576 B2
(45) Date of Patent: Sep. 30, 2014

(54) METHODS FOR INSPECTING SECURITY CERTIFICATES BY NETWORK SECURITY DEVICES TO DETECT AND PREVENT THE USE OF INVALID CERTIFICATES

(75) Inventors: Guy Guzner, Tel Aviv (IL); Ami Haviv, Hod Hasharon (IL); Danny Lieblich, Ramat Gan (IL); Yahav Gal, Kiryat Ono (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 0 days.

(21) Appl. No.: 13/411,567

(22) Filed: Mar. 4, 2012

(65) Prior Publication Data
US 2012/0167212 A1    Jun. 28, 2012

Related U.S. Application Data

(63) Continuation of application No. 12/356,117, filed on Jan. 20, 2009.

(51) Int. Cl.
*H04L 29/06* (2006.01)
*H04L 9/32* (2006.01)

(52) U.S. Cl.
CPC .......... *H04L 63/0823* (2013.01); *H04L 9/3268* (2013.01); *H04L 63/1408* (2013.01)
USPC ............................................ 726/22; 713/156

(58) Field of Classification Search
CPC .......................... H04L 9/3268; H04L 63/0823
USPC ...................................... 726/22, 10; 713/156
See application file for complete search history.

(56) References Cited

U.S. PATENT DOCUMENTS

| 6,614,781 B1 * | 9/2003 | Elliott et al. .................. 370/352 |
| 6,970,862 B2 | 11/2005 | Kwan |
| 7,177,839 B1 * | 2/2007 | Claxton et al. .................. 705/44 |
| 8,184,641 B2 * | 5/2012 | Alt et al. .................. 370/395.54 |
| 2001/0002485 A1 * | 5/2001 | Bisbee et al. ................. 713/167 |
| 2002/0004901 A1 | 1/2002 | Yip et al. |
| 2002/0029200 A1 * | 3/2002 | Dulin et al. ..................... 705/67 |
| 2003/0217165 A1 * | 11/2003 | Buch et al. ..................... 709/229 |
| 2004/0078573 A1 * | 4/2004 | Matsuyama .................. 713/175 |
| 2005/0114653 A1 * | 5/2005 | Sudia ............................ 713/158 |
| 2006/0155855 A1 | 7/2006 | Hamai |
| 2006/0174323 A1 * | 8/2006 | Brown et al. ..................... 726/3 |
| 2006/0204003 A1 | 9/2006 | Takata et al. |
| 2007/0079381 A1 * | 4/2007 | Hartung et al. ................. 726/26 |
| 2007/0180519 A1 * | 8/2007 | Boccon-Gibod et al. ....... 726/21 |
| 2008/0130895 A1 * | 6/2008 | Jueneman et al. ............ 380/277 |
| 2009/0037997 A1 * | 2/2009 | Agbabian et al. .............. 726/10 |

* cited by examiner

*Primary Examiner* — Techane Gergiso
(74) *Attorney, Agent, or Firm* — Mark M. Friedman

(57) ABSTRACT

Disclosed are methods and media for inspecting security certificates. Methods include the steps of: scanning, by a network security device, messages of a security protocol between a server and a client system; detecting the messages having a security certificate; detecting suspicious security certificates from the messages; and aborting particular sessions of the security protocol associated with the suspicious certificates. Preferably, the step of scanning is performed only on messages of server certificate records. Preferably, the method further includes the step of sending an invalid-certificate notice to the server and the client system. Preferably, the step of detecting the suspicious certificates includes detecting a use of an incorrectly-generated private key for the certificates. Preferably, the step of detecting the suspicious certificates includes detecting an unavailability of revocation information for the certificates. Preferably, the step of detecting the suspicious certificates includes detecting a use of an invalid cryptographic algorithm for the certificates.

14 Claims, 2 Drawing Sheets

METHODS FOR INSPECTING SECURITY CERTIFICATES BY NETWORK SECURITY DEVICES TO DETECT AND PREVENT THE USE OF INVALID CERTIFICATES

This is a Continuation of U.S. patent application Ser. No. 12/356,117, which was filed Jan. 20, 2009

FIELD AND BACKGROUND OF THE INVENTION

The present invention relates to methods for inspecting security certificates by network security devices to detect and prevent the use of invalid certificates.

In recent years, security has become an increasing concern in information systems. This issue has become more significant with the advent of the Internet and the ubiquitous use of network environments (e.g. LAN and WAN). An important area of IT security is ensuring that a host system's identity is verified before other (secured) host systems are allowed to interact with it. Security certificates are used to certify the veracity of a security protocol's endpoints. For example, certificates are used for the SSL (Secure Sockets Layer) protocol, and its successor, TLS (Transport Layer Security).

It is critical to validate the certificate presented by a web server, otherwise the client is exposed to many security risks, including "phishing", drive-by malware downloads, and cross-site scripting. In other words, the client system, and the person using it, must be assured of the authenticated identity of the server.

Certificates are normally issued by trustworthy Certificate Authorities (CAs), and thus can be relied upon. Such CAs may revoke certificates by issuing a certificate revocation list (CRL), and publishing the CRL at a well-known location (known as CRL distribution point, or CDP).

Technically, certificates comprise the CA's signature on a public key together with ancillary information (e.g. the end entity's domain name and key (certificate) usage constraints). The public key corresponds to a private key that typically remains in the possession of the end entity (i.e. the web server). Certificates usually form a "chain" in which a CA signs an end entity's certificate producing a new certificate, another CA signs that second certificate producing a third certificate, and the process can continue in that fashion. At the "top" of this chain is a highly-secure CA, known as a root CA.

There are cases where certificates cannot be relied upon. Some examples of unreliable certificates include the following.

(1) The private key may have been generated incorrectly. If this is a CA's private key, then all the certificates the CA has signed become vulnerable. For example, this occurred when the Debian operating system's random number generator was discovered to be badly flawed.
(2) Certificates may have been revoked, but for some reason (e.g. a CA going out of business) the revocation information is unavailable.
(3) Some certificates in the chain use cryptographic algorithms that have been (or are suspected to have been) broken.

An end entity (also known as a relying party) is responsible to verify the certificate chain of any party which establishes a secure communication channel. This verification algorithm is typically embedded in web browsers, and can detect many cases of invalid certificates. However, the cases listed above, as well as others, are not detected by the standard verification mechanisms. These cases may be resolved by deeper inspection of the certificate chain.

Methods for inspecting security certificates have primarily enabled endpoint-level solutions. An example of such a solution is SSL Blacklist 4.0 (available from CodeFromThe70s.org) which is a plug in for the Firefox browser.

It would be desirable to have methods for inspecting security certificates by network security devices to detect and prevent the use of invalid certificates.

SUMMARY OF THE INVENTION

It is the purpose of the present invention to provide methods for inspecting security certificates by network security devices to detect and prevent the use of invalid certificates.

Preferred embodiments of the present invention teach methods for inspecting security certificates by network security devices, and provide a platform on which new certificate-related vulnerabilities can be built into the detection protocol. It is noted that "SSL inspection" is a related but different technology in which the entire SSL connection is decrypted by a network device so that previously-encrypted traffic can be inspected. In preferred embodiments of the present invention, the traffic is not decrypted by the network device, and only the cleartext portions of the SSL "handshake" are inspected.

Therefore, according to the present invention, there is provided for the first time a method for inspecting security certificates, the method including the steps of: (a) scanning, by a network security device, messages of a security protocol between a server and a client system; (b) detecting the messages having a security certificate; (c) detecting suspicious security certificates from the messages; and (d) aborting particular sessions of the security protocol associated with the suspicious security certificates.

Preferably, the step of scanning is performed only on messages of server certificate records.

Preferably, the method further includes the step of: (e) sending an invalid-certificate notice to the server and the client system.

Preferably, the step of scanning includes: (i) scanning the messages for an MD5withRSA object ID (OID); and (ii) scanning the messages for an ns-cert-exts.comment OID.

More preferably, the step of detecting the suspicious security certificates includes: (i) upon detecting the ns-cert-exts.comment OID in the messages, checking a comment length of the ns-cert-exts.comment OID for invalid-certificate criteria.

Most preferably, the step of detecting the suspicious security certificates further includes: (ii) prior to the step of checking, determining that the MD5withRSA OID and the ns-cert-exts.comment OID are in the same trust chain member by searching for a second appearance of the MD5withRSA OID.

Most preferably, the invalid-certificate criteria include a comment length of more than 200 bytes and at least one non-ASCII character contained in the ns-cert-exts.comment OID.

Preferably, the step of detecting the suspicious security certificates includes detecting a use of an incorrectly-generated private key for the security certificates.

Preferably, the step of detecting the suspicious security certificates includes detecting an unavailability of revocation information for the security certificates.

Preferably, the step of detecting the suspicious security certificates includes detecting a use of an invalid cryptographic algorithm for the security certificates.

According to the present invention, there is provided for the first time a computer-readable storage medium having computer-readable code embodied on the computer-readable storage medium, the computer-readable code including: (a) program code for scanning, by a network security device, messages of a security protocol between a server and a client system; (b) program code for detecting the messages having a security certificate; (c) program code for detecting suspicious security certificates from the messages; and (d) program code for aborting particular sessions of the security protocol associated with the suspicious security certificates.

Preferably, the program code for scanning is performed only on messages of server certificate records.

Preferably, the computer-readable code further includes: (e) program code for sending an invalid-certificate notice to the server and the client system.

Preferably, the program code for scanning includes: (i) program code for scanning the messages for an MD5withRSA object ID (OID); and (ii) program code for scanning the messages for an ns-cert-exts.comment OID.

More preferably, the program code for detecting the suspicious security certificates includes: (i) program code for, upon detecting the ns-cert-exts.comment OID in the messages, checking a comment length of the ns-cert-exts.comment OID for invalid-certificate criteria.

Most preferably, the program code for detecting the suspicious security certificates further includes: (ii) program code for, prior to the checking, determining that the MD5withRSA OID and the ns-cert-exts.comment OID are in the same trust chain member by searching for a second appearance of the MD5withRSA OID.

Most preferably, the invalid-certificate criteria include a comment length of more than 200 bytes and at least one non-ASCII character contained in the ns-cert-exts.comment OID.

Preferably, the program code for detecting the suspicious security certificates includes program code for detecting a use of an incorrectly-generated private key for the security certificates.

Preferably, the program code for detecting the suspicious security certificates includes program code for detecting an unavailability of revocation information for the security certificates.

Preferably, the program code for detecting the suspicious security certificates includes program code for detecting a use of an invalid cryptographic algorithm for the security certificates.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods for inspecting security certificates by network security devices to detect and prevent the use of invalid certificates. The principles and operation for such inspection of security certificates, according to the present invention, may be better understood with reference to the accompanying description and the drawings.

Figure 1:
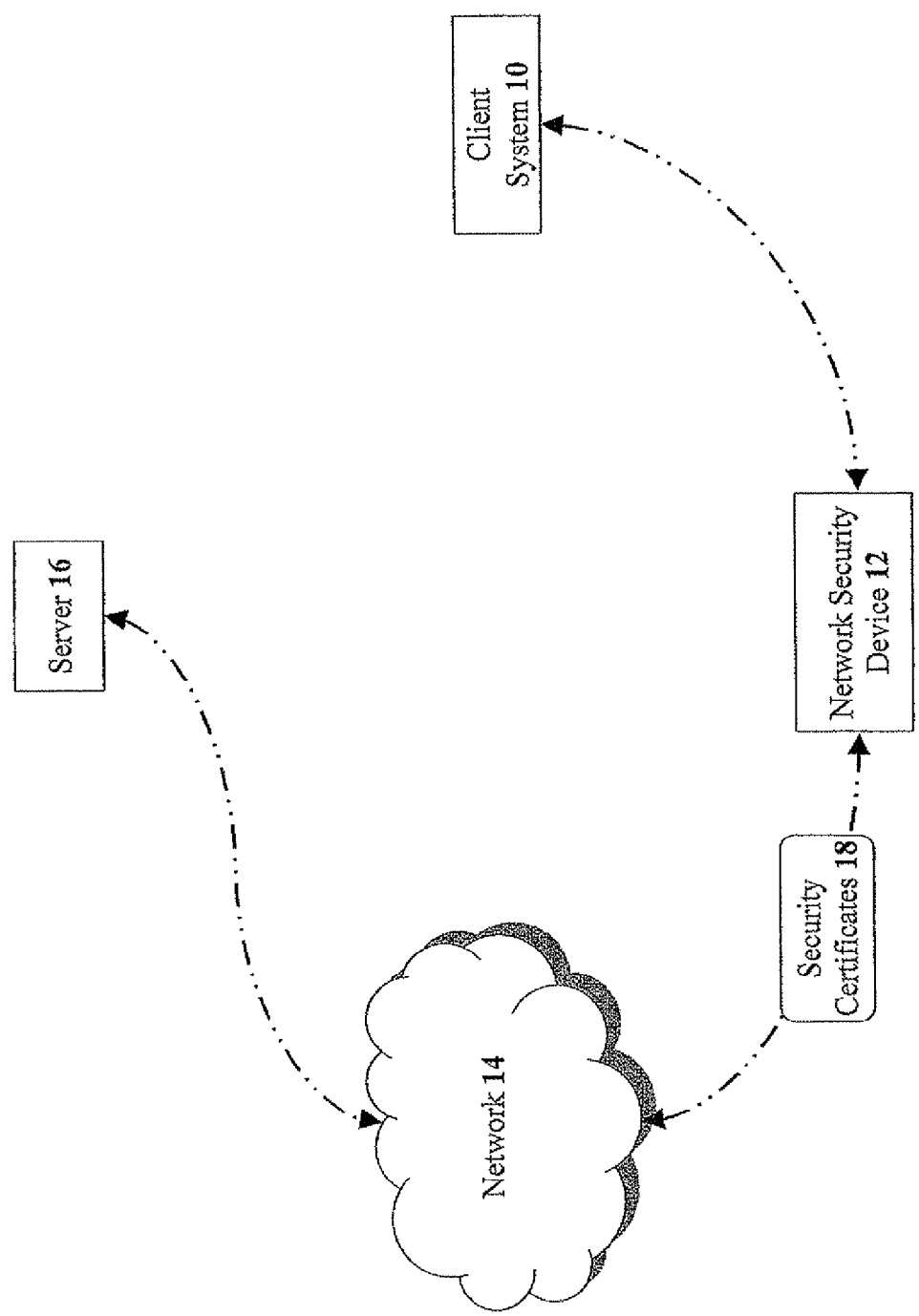
FIG. 1 is a simplified schematic block diagram of the system architecture for inspecting security certificates by a network security device, according to preferred embodiments of the present invention.

Referring now to the drawing, FIG. 1 is a simplified schematic block diagram of the system architecture for inspecting security certificates by a network security device, according to preferred embodiments of the present invention. A client system 10 is operationally connected, via a network security device 12, to a network 14 (e.g. the Internet) which connects to a server 16 (e.g. a web server). In order to detect invalid certificates, each message of a security protocol that uses security certificates 18 between server 16 and client system 10 is scanned by network security device 12.

Attacks based on known weaknesses in the cryptographic hash function known as MD5 are used as an exemplary embodiment of the present invention. In 2004, researchers from China showed it was possible to generate the same MD5 fingerprint for two different messages using off-the-shelf computer hardware. Three years later, a separate group of researchers built off of those findings by showing how to have almost complete freedom in the choice of both messages.

The latest findings take the known MD5 weaknesses a step further by showing how so-called collisions allow for the creation of valid digital credentials used by CAs. Once the researchers have generated the rogue CA certificate, they can create security certificates for any site that will be accepted by just about any web-connecting device.

Figure 2:
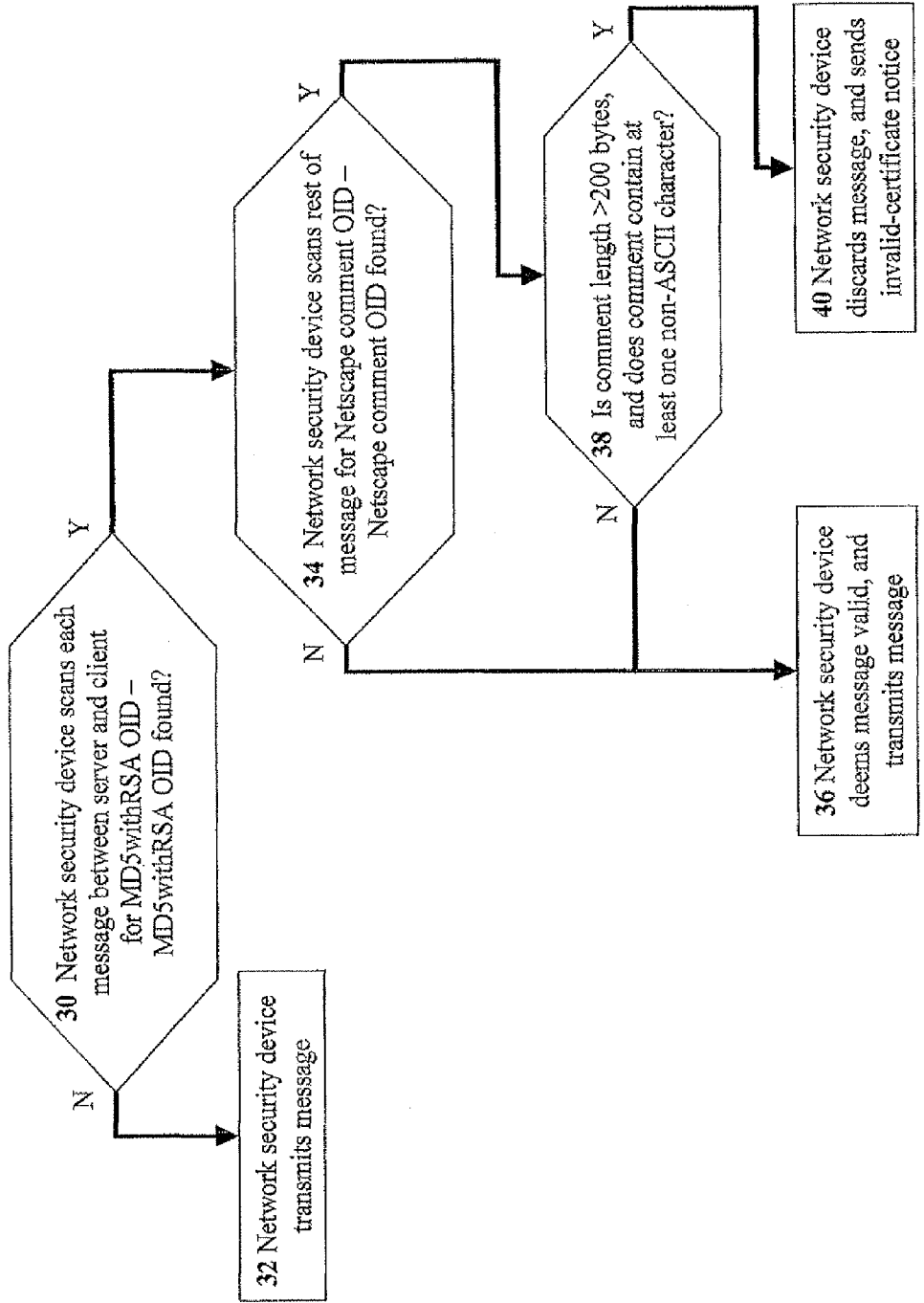
FIG. 2 is a simplified flowchart of the major operational steps for inspecting security certificates by a network security device, according to preferred embodiments of the present invention.

FIG. 2 is a simplified flowchart of the major operational steps for inspecting security certificates by a network security device, according to preferred embodiments of the present invention. The process starts with the network security device scanning each message between the server and the client for the Object Identifier (OID) of the MD5withRSA signature hash algorithm (10 bytes) (Step 30). If the MD5withRSA OID is not found, the message is transmitted (Step 32).

It is noted that while the specific scan described herein is just for one possible weakness (i.e. the recent MD5 vulnerability) as an exemplary embodiment, many other scans are possible for detecting other vulnerabilities using the methods described herein.

If the MD5withRSA OID is found, the rest of the message is scanned for the OID of the ns-cert-exts.comment ("Netscape comment") certificate extension (11 bytes) (Step 34). If the Netscape comment OID is not found, the message is transmitted (Step 36). If the Netscape comment OID is found, the length of the is comment is checked to determine whether there are more than 200 bytes, and whether the comment contains at least one non-ASCII character (a character whose most significant bit is 1) (Step 38). If the certificate is deemed valid, the message is transmitted (Step 36). If the certificate is invalid (i.e has an MD5withRSA OID, and has a long enough Netscape comment field that includes non-ASCII characters in the first 16 bytes), the message is discarded, and an invalid-certificate notice is sent (Step 40).

The above scan is based on the published attack in which the "manufactured fake certificate" replaces the initial part of the Netscape-comment field (which normally consists of ASCII text only) with binary data.

It is noted that there is a case that is not covered by the method described above. An attacker may use a different extension to hide the MD5 collision bits or use the same extension with only 7-bit characters.

Two scenarios that can generate false positives are:
(1) the two OIDs are randomly found in a message which is not a server certificate (highly unlikely); and (2) the two OIDs belong to different members of the trust chain.

Several modifications to the scheme described above are contemplated including:

(1) limiting the inspection to server certificate records only; and
(2) making sure that the MD5withRSA and Netscape comment are in the same trust chain member by searching for a second appearance of the MD5withRSA OID.

While the invention has been described with respect to a limited number of embodiments, it will be appreciated that many variations, modifications, and other applications of the invention may be made.

What is claimed is:

1. A method for inspecting security certificates, the method comprising the steps of by a network security device:
   (a) detecting messages, of a security protocol between a server and a client system, that have a security certificate;
   (b) detecting suspicious security certificates from said messages, by steps including:
      (i) scanning said messages for an object ID (OID) of a compromised cryptographic hash function, and
      (ii) scanning said messages for an OID of a certificate extension;
      (iii) upon detecting said OID of said certificate extension in said messages, checking a comment length of said OID of said certificate extension for invalid-certificate criteria, said invalid-certificate criteria including an excessive comment length and at least one non-ASCII character contained in said OID of said certificate extension; and
   (c) aborting sessions of said security protocol associated with said suspicious security certificates that are determined, by said detecting of said suspicious security certificates, to be invalid.

2. The method of claim 1, wherein said step of detecting suspicious security certificates is performed only on messages of server certificate records.

3. The method of claim 1, the method further comprising the step of:
   (d) sending an invalid-certificate notice to said server and said client system.

4. The method of claim 1, wherein said step of detecting said suspicious security certificates further includes:
   (iv) prior to said step of checking, determining that said OID of said compromised cryptographic hash function and said OID of said certificate extension are in the same trust chain member by searching for a second appearance of said OID of said compromised cryptographic hash function.

5. The method of claim 1, wherein said step of detecting said suspicious security certificates includes detecting a use of an incorrectly-generated private key for said security certificates.

6. The method of claim 1, wherein said step of detecting said suspicious security certificates includes detecting an unavailability of revocation information for said security certificates.

7. The method of claim 1, wherein said step of detecting said suspicious security certificates includes detecting a use of an invalid cryptographic algorithm for said security certificates.

8. A non-transitory computer-readable storage medium having computer-readable code embodied on the computer-readable storage medium, the computer-readable code being for inspection of security certificates by a network security device, the computer-readable code comprising:
   (a) program code for detecting messages, of a security protocol between a server and a client system, that have a security certificate;
   (b) program code, for detecting suspicious security certificates from said messages, including:
      (i) program code for scanning said messages for an object ID (OID) of a compromised cryptographic hash function, and
      (ii) program code for scanning said messages for an OID of a certificate extension;
      (iii) program code for, upon detecting said OID of said certificate extension in said messages, checking a comment length of said OID of said certificate extension for invalid-certificate criteria, said invalid-certificate criteria including an excessive comment length of more than 200 bytes and at least one non-ASCII character contained in said OID of said certificate extension; and,
   (c) program code for aborting sessions of said security protocol associated with said suspicious security certificates that are determined, by said detecting of said suspicious security certificates, to be invalid.

9. The storage medium of claim 8, wherein said program code for detecting suspicious security certificates is performed only on messages of server certificate records.

10. The storage medium of claim 8, the computer-readable code further comprising:
    (d) program code for sending an invalid-certificate notice to said server and said client system.

11. The storage medium of claim 8, wherein said program code for detecting said suspicious security certificates further includes:
    (iv) program code for, prior to said checking, determining that said OID of said compromised cryptographic hash function and said OID of said certificate extension are in the same trust chain member by searching for a second appearance of said OID of said compromised cryptographic hash function.

12. The storage medium of claim 8, wherein said program code for detecting said suspicious security certificates includes program code for detecting a use of an incorrectly-generated private key for said security certificates.

13. The storage medium of claim 8, wherein said program code for detecting said suspicious security certificates includes program code for detecting an unavailability of revocation information for said security certificates.

14. The storage medium of claim 8, wherein said program code for detecting said suspicious security certificates includes program code for detecting a use of an invalid cryptographic algorithm for said security certificates.

* * * * *